United States Patent
Nakagawa (10) Patent No.: US 6,666,438 B2
(45) Date of Patent: Dec. 23, 2003

(54) CYLINDRICAL ELASTIC MOUNT

(75) Inventor: Yoshihiro Nakagawa, Nagoya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/113,080

(22) Filed: Apr. 1, 2002

(65) Prior Publication Data

US 2002/0140146 A1 Oct. 3, 2002

(30) Foreign Application Priority Data

Mar. 30, 2001 (JP) ........................................ 2001-102322

(51) Int. Cl.$^7$ .............................. F16F 1/38; F16F 15/08; B60G 7/02
(52) U.S. Cl. .............................. 267/141.2; 267/140.12; 267/141.3; 267/141.7
(58) Field of Search ......................... 267/140.12, 141.1, 267/141.2–141.7

(56) References Cited

U.S. PATENT DOCUMENTS

| | | | |
|---|---|---|---|
| 4,767,108 A | * | 8/1988 | Tanaka et al. .......... 267/140.12 |
| 5,941,511 A | * | 8/1999 | Dawda et al. .......... 267/140.12 |
| 6,164,405 A | * | 12/2000 | Sakata ..................... 267/141.3 |
| 6,170,812 B1 | * | 1/2001 | Nicoles ...................... 267/281 |

FOREIGN PATENT DOCUMENTS

| | | |
|---|---|---|
| JP | 2-11244 | 1/1990 |
| JP | 8-210406 | 8/1996 |
| JP | 2981598 | 9/1999 |
| JP | 2000-161434 | 6/2000 |

* cited by examiner

*Primary Examiner*—Matthew C. Graham
(74) *Attorney, Agent, or Firm*—Rossi & Associates

(57) ABSTRACT

Disclosed is a cylindrical elastic mount including an inner sleeve member having an outward flange portion at one and an outer sleeve member disposed around the inner sleeve member with a radial spacing therebetween. The outer sleeve member has an outward flange portion at one end on the side of the flange portion of the inner sleeve member so that the flange portions of the inner and outer sleeve members are opposed to each other with an axial spacing between respective opposite surfaces of the flange portions. An elastic body disposed in the radial spacing between the inner and outer sleeves and the axial spacing between the flange portions for elastically connecting the inner and outer sleeve member. The opposite surfaces of the flange portions of the inner and outer sleeve members have respective tapered surfaces, which extend approximately parallel to each other in an axially outward direction inclined to a central axis of the mount, and are elastically connected with each other via the elastic body interposed therebetween.

9 Claims, 5 Drawing Sheets

CYLINDRICAL ELASTIC MOUNT

INCORPORATED BY REFERENCE

The disclosure of Japanese Patent Application No. 2001-102322 filed on Mar. 30, 2001 including the specification, drawings and abstract is incorporated herein by reference in its entirety.

BACKGROUND OF THE INVENTION

1. Field of the Invention

The present invention relates generally to a cylindrical elastic mount in which an inner shaft member and an outer sleeve member are elastically connected with each other by an elastic body interposed therebetween, and include flange portions formed at respective ones of axially opposite end portions thereof such that the flange portions are opposed to each other in an axial direction of the cylindrical elastic mount via the elastic body interposed therebetween. More particularly, the present invention is concerned with such a cylindrical elastic mount suitable for use in an automotive vehicle as a member mount, a deferential mount, a body mount and other connecting members, and a vibration isolating connector or a cylindrical elastic mount assembly including the cylindrical elastic mount as a component.

2. Description of the Related Art

A cylindrical elastic mount is known as one type of an vibration isolating connector interposed between two members of a vibration system. A member mount is one example of the cylindrical elastic mount, and is disposed between a sub-flame, e.g., a suspension member and a cross member, and a body of the vehicle for elastically supporting the sub-flame on the body in a vibration-isolating fashion. Such a known cylindrical elastic mount generally includes an inner metal sleeve and an outer metal sleeve, which are disposed in co-axial relation with each other and elastically connected with each other by a rubber elastic body interposed therebetween, and is installed between two members of the vibration system such that the outer metal sleeve is press-fitted into a fixing bore formed in one of the two members and the inner metal sleeve is fixedly assembled with a rod member formed in the other member and extending through its bore.

The known cylindrical elastic mount is required not only to exhibit a vibration damping or isolating effect with respect to a vibrational load applied thereto in an axial direction thereof from the suspension member and a power unit of the vehicle, but also to provide a stopper function for restricting an amount of displacement of the inner and outer metal sleeves relative to each other in a shock absorbing manner, upon application of a relatively large vibrational load to the cylindrical elastic mount.

For enabling the cylindrical elastic mount to exhibit the required high vibration isolating characteristics with respect to the vibrational load applied thereto in the axial direction, it is effective to arrange the cylindrical elastic mount so as to exhibit linear low spring characteristics within a large stroke range when the inner and outer metal sleeves are displaced relative to each other in the axial direction. Likewise, for enabling the cylindrical elastic mount to provide an excellent stopper function, it is effective to arrange the cylindrical elastic mount so as to exhibit non-linear spring characteristics wherein an axial spring constant of the rubber elastic body is smoothly increased.

Examples of the conventional member mounts are disclosed in JP-A-2000-61434, JP-B-2981598 and JP-A-210406, wherein the inner and outer metal sleeves have integrally formed flange portions, respectively, which are opposed to each other in the axial direction with the rubber elastic body interposed therebetween. When the inner and outer metal sleeves are displaced relative to each other in the axial direction, the elastic body interposed between the flange portions of the inner and outer sleeve members is accordingly compressed by and between the flange portions in the axial direction substantially entirely. Therefore, the conventional cylindrical elastic mount is likely to exhibit spring characteristics, i.e., load-deflection characteristics such that a low load region assuring a linear change of a low spring constant is narrowed, and the spring constant of the cylindrical elastic mount is skyrocketed in a high load region outside the low load region. Thus, the conventional member mount experiences an abrupt change of its spring constant when a relatively high vibrational load is applied thereto, and therefore is not able to sufficiently exhibit the vibration isolating capability with respect to the vibrational load applied thereto in the axial direction, and a shock absorbing capability upon application of the relatively large vibrational load thereto in the axial direction.

SUMMARY OF THE INVENTION

It is therefore an object of the invention to provide a cylindrical elastic mount which is novel in construction, and which is capable exhibiting an improved axial vibration isolating capability with the help of spring characteristics of the cylindrical elastic mount wherein a low load region permitting the cylindrical elastic mount to exhibit linear spring characteristics is extended, while being capable of restricting an axial displacement of an inner and outer metal sleeve relative to each other in a shock absorbing manner with the held of the spring characteristics of the cylindrical elastic mount wherein the spring constant of the cylindrical elastic mount is smoothly increased upon application of a relatively large vibrational load to the cylindrical elastic mount.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A cylindrical elastic mount comprising: (a) an inner shaft member having an integrally formed flange portion extending radially outwardly from one of axially opposite ends thereof; (b) an outer sleeve member disposed around the inner shaft member with a radial spacing therebetween, the outer sleeve member having an integrally formed flange portion extending radially outwardly from one of axially opposite ends thereof corresponding to the one of axially opposite ends of the inner shaft member so that the flange portions of the inner shaft member and the outer sleeve member are opposed to each other in an axial direction parallel to a central axis of said cylindrical elastic mount with a given axial spacing between respective opposite surfaces of said flange portions; and (c) an elastic body disposed in the radial spacing between the inner shaft member and the outer sleeve member and in the axial spacing between the flange portions for elastically connecting the inner shaft member and the outer sleeve member; wherein the opposite surfaces of the flange portions of the inner shaft member and the outer sleeve member include respective tapered surfaces, which extend approximately parallel to each other in an axially outward direction inclined to the central axis, and are elastically connected with each other via the elastic body interposed therebetween.

In the cylindrical elastic mount constructed according to this mode of the invention, the flange portions of the inner shaft member and the outer sleeve member are opposed to each other in the direction inclined to the central axis of the cylindrical member at respective tapered surfaces of the opposite surfaces thereof. An axial vibrational load applied between the inner shaft member and the outer sleeve member acts on the flange portions and a part of the elastic body interposed between the flange portions in a direction inclined to the direction in which the tapered surface are opposed to each other and the elastic body has a thickness. Therefore, the applied axial vibrational load may act on the elastic body interposed between the tapered surfaces of the flange portions as components in a shear direction and a compression direction.

In the conventional elastic mount, since the opposite surfaces of the flange portions extend in the radial direction perpendicular to the central axis thereof, the elastic body interposed between the opposite surfaces of the flange portions is inevitably entirely subjected to compressive deformation upon application of the axial vibrational load thereto, eventually suffering from difficulty in exhibiting low spring characteristics over a wide load range and exhibiting moderate increase of the spring constant in a relatively high load region, as discussed above. In comparison with this conventional cylindrical elastic mount, the present cylindrical elastic mount is able to exhibit low spring characteristics of the elastic body with respect to axial vibrational loads, in accordance with the angle of incline of the tapered surfaces of the flange portions of the inner shaft member and the outer sleeve member to the central axis of the cylindrical elastic mount. As a result, the present cylindrical elastic mount permits the inner shaft member and the outer sleeve member to displace relative to each other over an enlarged axial distance without causing an abrupt increase of the spring constant of the elastic body. In other words, the present cylindrical elastic mount permits a relatively large stroke length of the elastic body, thus exhibiting an improved vibration damping characteristics thereof with the help of the low spring characteristics of the elastic body assured for the relatively wide load range. In addition, the load-deflection curve of the present cylindrical elastic mount has a relatively moderate slope in a relatively high load region. Thus, the present cylindrical elastic mount makes it possible to restrict an amount of axial displacement of the inner shaft member and the outer sleeve member relative to each other in a shock-absorbing manner, effectively.

In order to tune the spring characteristics or spring ratio (spring constant in a first diametric direction/spring constant in a second diametric direction perpendicular to the first diametric direction) of the present cylindrical elastic mount, the elastic body is desirably provided with voids or recesses each extending in the axial direction between the inner shaft member and the outer sleeve member.

(2) A cylindrical elastic mount according to the above-indicated mode (1), wherein the flange portion of the inner shaft member includes a portion opposed to the flange portion of the outer sleeve member via the elastic body, and having an outer diameter larger than an inner diameter of the outer sleeve member. This arrangement ensures that the flange portion of the inner shaft member and the flange portion of the outer sleeve member are opposed to each other via the elastic body in the axial direction as well, thereby increasing the area of a compressed part of the elastic body upon application of the axial load to the cylindrical elastic mount, resulting in improved durability of the cylindrical elastic mount with respect to the axial load.

(3) A cylindrical elastic mount according to the above-indicated mode (1) or (2), wherein the tapered surfaces of the flange portions of the inner shaft member and the outer sleeve member are inclined at an angle within a range of 40°–70° with respect to the central axis of the cylindrical elastic mount. In this mode of the invention, the part of the elastic body interposed between the tapered surfaces of the flange portions of the inner shaft member and the outer sleeve member is subjected to a compression and a shear component at a suitable ratio of the axial load applied to the cylindrical elastic mount. This arrangement allows the cylindrical elastic mount to provide both of an improved vibration damping capability with respect to the axial vibrational load and an improved stopper function for limiting the axial displacement of the inner shaft member and the outer sleeve member relative to each other, in a further effective manner.

(4) A cylindrical elastic mount according to any one of the above-indicated modes (1)–(3), wherein each of the opposite surfaces of the flange portions of the inner shaft member and the outer sleeve member has a tapered cylindrical shape so that the tapered surface of the opposite surface is formed so as to extend in a circumferential direction of the corresponding flange portion over an entire circumference of the corresponding flange portion. This arrangement effectively increase the area of the opposite surfaces of the flange portions of the inner shaft member and the outer sleeve member, making it possible for the cylindrical elastic mount to exhibit desired linear spring characteristics with respect to axial loads over a wide load range and to provide a desired moderate increase of the spring constant upon application of the relatively large vibrational load to the cylindrical elastic mount.

(5) A cylindrical elastic mount according to any one of the above-indicated modes (1)–(4), wherein the opposite surface of the flange portion of the inner shaft member has a tapered cylindrical shape so that the tapered surface is formed so as to extend in a circumferential direction over an entire circumference of the flange portion of the inner shaft member, while the flange portion of the outer sleeve member includes a plurality of inclined plate parts formed at respective circumferential positions of the flange portion so as to extend in the axially outward direction inclined to the central axis of said cylindrical elastic mount and so as to extend in a circumferential direction of said flange portion with a given circumferential length, wherein the plurality of inclined plate parts are spaced apart from one another in a circumferential direction of the flange portion of the outer sleeve member by a plurality of flat plate parts, which are integrally formed at respective circumferential portions located between adjacent ones of circumferential portions from which the plurality of inclined plates extend axially outwardly, so as to extend radially outwardly, and wherein the plurality of inclined plate parts cooperate to form the tapered surface of the outer sleeve member, which is opposed to the opposite surface of the inner sleeve having the tapered cylindrical shape. In this mode of the invention, the flange portion of the outer sleeve member includes the plurality of flat plate parts extending in the radial direction perpendicular to the central axis of the cylindrical elastic mount. When the outer sleeve member is press-fitted into a fixing bore formed in the vibrative member, the flat plate parts are brought into abutting contact with the open-end surface of the fixing bore for thereby positioning the outer sleeve member relative to the fixing bore, effectively. Namely, a mechanism for positioning the outer sleeve member relative to the vibrative member is effectively provided by means of a stable contact of the flat plate parts extending radially outwardly of the outer sleeve member with the surface of the vibrative member. This arrangement accordingly eliminates a need for forming on the surface of the vibrative member a tapered abutting surfaces or the like for stably supporting the flange portion of the outer sleeve member.

(6) A cylindrical elastic mount according to any one of the above-indicated modes (1)–(5), wherein the flange portion of the outer sleeve member includes an inclined plate part integrally formed at least one circumferential portion thereof so as to extend in an inclined axially outward direction, and the outer sleeve member includes an annular plate part formed at an outer circumferential portion thereof so as to extend radially outwardly therefrom, and so as to be located at an axial position on the central axis of the cylindrical elastic mount, which is approximately equal to that of the inner circumferential end portion of the inclined plate part. In this mode of the invention, the outer sleeve member can be positioned relative to the vibrative member by an abutting contact of the annular plate part with the open-end face of the fixing bore of the vibrative member. Namely, a mechanism for positioning the outer sleeve member relative to the vibrative member is effectively provided by means of a stable contact of the radially outwardly extending annular plate part with the surface of the vibrative member. Like in the above-indicated mode (5), this arrangement eliminates a need for forming on the surface of the vibrative member a tapered abutting surfaces or the like for stably supporting the flange portion of the outer sleeve member, while allowing the vibrative ember to support the outer sleeve member with high strength as measured in the axial direction.

(7) A vibration isolating connector for connecting two members in a vibration isolating fashion, comprising a cylindrical elastic mount according to any one of the above-indicated modes (1)–(6), wherein the inner shaft member is adapted to be connected to one of the two members and the outer sleeve member is adapted to be connected to an other one of the two members so that the vibration isolating connector is subjected to a static load applied thereto in the axial direction so as to compressively deform the elastic body interposed between the flange portions of the inner shaft member and the outer sleeve member.

(8) A cylindrical elastic mount assembly comprising a pair of cylindrical elastic mounts each being constructed according to any one of the above-indicated modes (1)–(7), wherein the pair of cylindrical elastic mounts are fixedly connected to each other such that the inner shaft members fixedly connected with each other with other ones of the axially opposite ends thereof remote from the flange portions being opposed to each other, and the outer sleeve members are fixedly connected with each other with other ones of said axially opposite ends thereof remote from the flange portions being opposed to each other, and wherein the elastic body of each of the pair of cylindrical elastic mounts is held under an axial compressive force between the flange portions of the inner shaft member and the outer sleeve member.

In the vibration isolating connector according to the above-indicated mode (7) and the cylindrical elastic mount assembly according to the above-indicated mode (8), the elastic body of each of the cylindrical elastic mount is held under the axial compressive force, i.e., is pre-compressed, making it possible to enhance anti-load capacity and durability of the elastic body and the cylindrical elastic mount.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
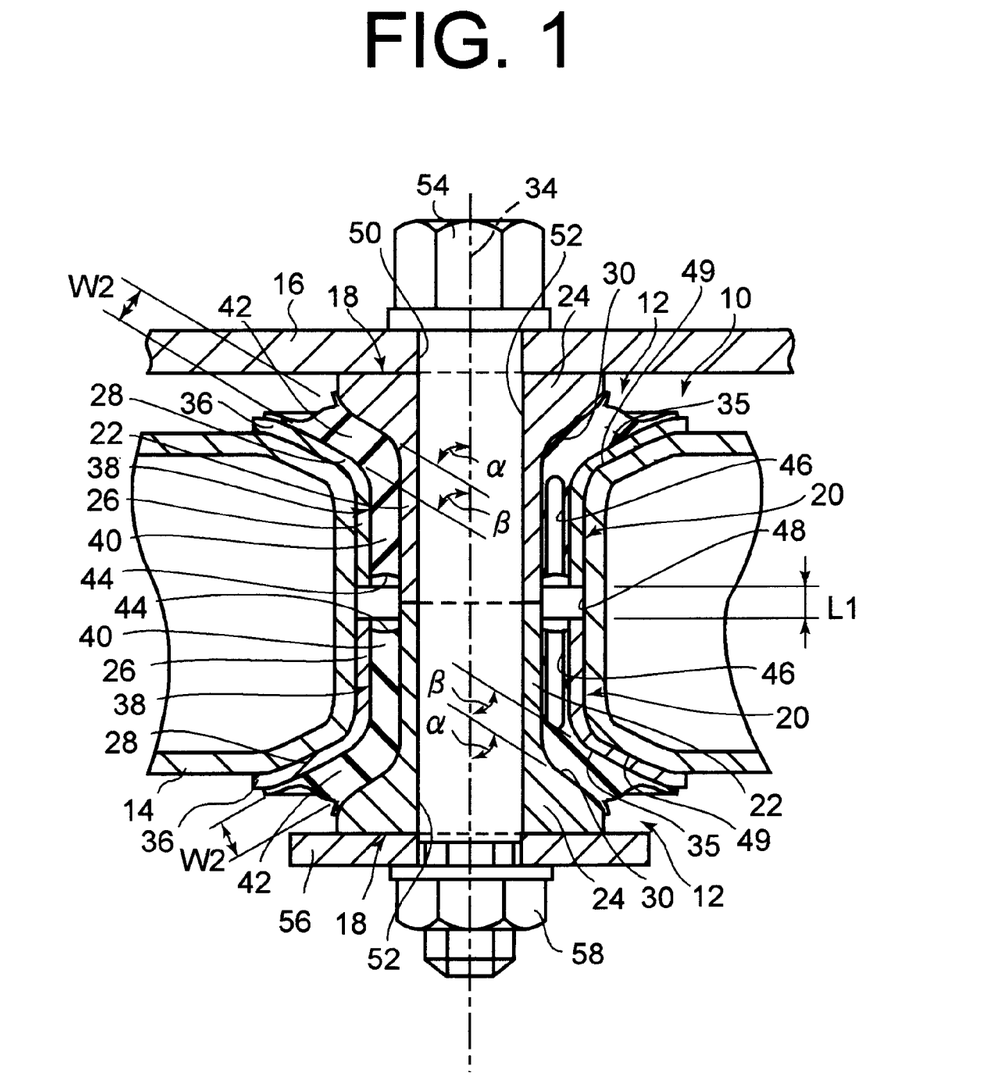
FIG. 1 is an elevational view in vertical or axial cross section of a cylindrical rubber mount assembly constructed according to a first embodiment of the present invention in a state where the assembly is installed on an automotive vehicle.
Figure 2:
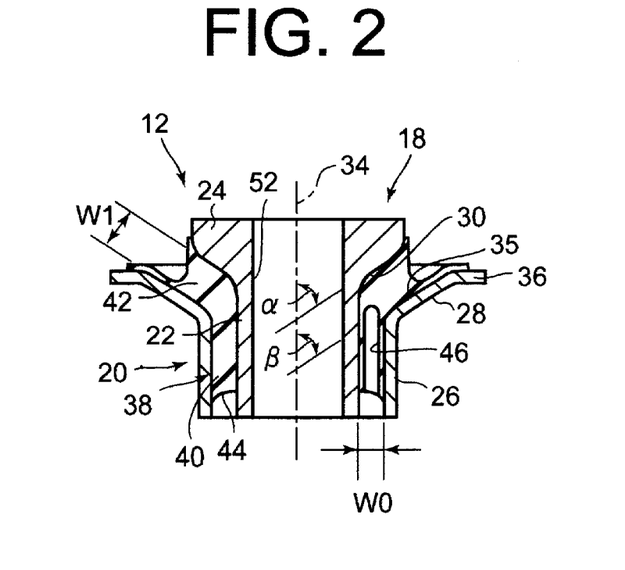
FIG. 2 is a cross sectional view of one of a pair of vibration-isolating bushings of the assembly of FIG. 1, taken along line 2—2 of FIG. 3.
Figure 3:
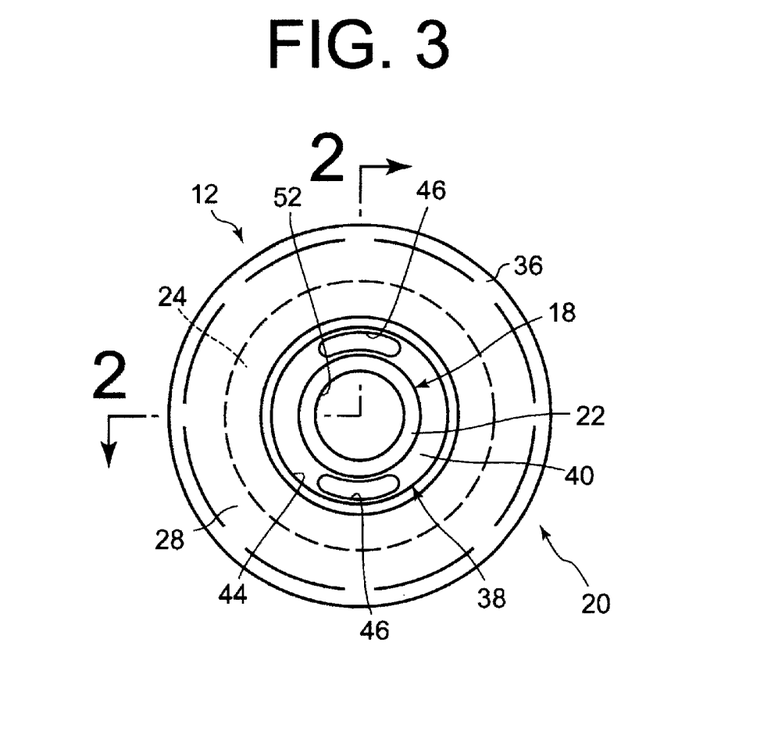
FIG. 3 is a bottom plane view of the vibration isolating bushing of FIG. 2.

Referring first to FIGS. 1–3, a cylindrical rubber mount assembly 10 constructed according to a first embodiment of a cylindrical elastic mount assembly of the invention is depicted. This cylindrical rubber mount assembly 10 is installed in a connecting portion of a suspension member for connection thereof with a body 16 of an automotive vehicle for supporting the suspension member on the body 16 of the vehicle in a vibration isolating fashion. A pair of cylindrical elastic mounts in the form of a pair of vibration isolating bushings 12 are assembled in the axial direction and interposed between the body 16 as one of two members to be connected in the vibration isolating fashion, and the suspension member 14 as the other member. The cylindrical rubber mount assembly 10 supports the suspension member 14 against the body 16, while preventing undesirable transmission vibrations between two members.

More specifically described, the pair of vibration isolating bushings 12 are identical with each other in construction as shown in FIGS. 2 and 3. The vibration isolating bushing 12 includes an inner shaft member in the form of a cylindrical inner sleeve 18 and an outer sleeve member in the form of a cylindrical outer sleeve 20. The inner and outer sleeve 18, 20 are both made of metal. The inner sleeve 18 includes a cylindrical part 22 having a relatively small diameter, and one end (the top end in FIG. 2) of the cylindrical part 22 in the axial direction provides an integrally formed flange portion 24 extending in the radially outward direction.

Similarly, the outer sleeve 20 includes a cylindrical part 26 having a relatively large diameter, and a flange portion 28 integrally formed at and extending radially outwardly from one end of the cylindrical part 26 in the axial direction. The inner and outer sleeves 18 and 20 may be advantageously formed by pressing, forging, cutting, and other such processing. In the present embodiment, the outer sleeve 20 is made thinner than the inner sleeve 18, and the cylindrical part 26 of the outer sleeve 20 is made larger in diameter and made smaller in axial length by a given value than the cylindrical part 22 of the inner sleeve 18. The outer sleeve 20 is disposed around the inner sleeve 18 such that the inner and outer sleeves 18, 20 are located in a coaxial or concentric relation with each about a central axis 34 with a radial spacing interposed therebetween.

The flange portion 24 of the inner sleeve 18 and the flange portion 28 of the outer sleeve 20 are positioned on the same side in the axial direction, and the outer sleeve 20 is slightly offset in the axial direction away from the flange portion 24 of the inner sleeve 18.

The flange portion 24 of the inner sleeve 18 has an opposite surface in the form of an axially inner surface 30 thereof which is opposed to an opposite surface in the form of an axially outer surface 35 of the flange portion 28 of the outer sleeve 20. The axially inner surface 30 has a tapered cylindrical shape extending radially outwardly following the axially outward direction. Nearly the entirety of the axially inner surface 30 inclines axially outward direction at a suitably determined angle of incline $\alpha$ with respect to the central axis 34 of the inner sleeve 18. A favorable range of the angle of incline $\alpha$ of the axially inner surface 30 is 40 to 65 degrees.

The flange portion 28 of the outer sleeve 20 has a tapered cylindrical shape extending radially outwardly following the axially outward direction, and protrudes from the cylindrical part 26 of the outer sleeve 20 in the axially outward direction at a suitably determined angle of incline $\beta$ with respect to the central axis 34 of the outer sleeve 20. The axially outer surface 35 of the flange portion 28 is provided such that the angle of incline $\beta$ to the central axis 34 is approximately the same as the angle of incline $\alpha$ of the axially inner surface 30 of the flange portion 24 of the inner sleeve 18, and the axially inner and outer surfaces 30, 35 extend parallel to each other with a given distance W1 interposed therebetween. The distance W1 between the opposite surfaces, i.e., the axially inner and outer surfaces 30 and 35 of the respective flange portions 24 and 28 of the inner and outer sleeves 18 and 20 is thereby approximately constant from the inner circumferential end portion to the outer circumferential end portion. Further, the flange portion 28 of the outer sleeve 20 is arranged to have a minimal inner diameter that is larger than the external diameter of the cylindrical part 22 of the inner sleeve 18 and smaller than the maximum outer diameter of the flange portion 24 of the inner sleeve 18, and a maximal inner diameter larger than the maximum outer diameter of the flange portion 24 of the inner sleeve 18.

As is understood from the aforementioned description, in the present embodiment, the tapered surfaces of the inner and outer sleeves 18 and 20 are constructed with the axially inner surface 30 of the flange portion 24 of the inner sleeve 18 and the axially outer surface 35 in the axial direction of the flange portion 28 of the outer sleeve 20. An annular plate part 36 having an annular disk-like shape is integrally formed at the outer circumferential end portion of the flange portion 28 of the outer sleeve 20 so as to extend radially outwardly over the entire circumference of the flange portion 28 with approximately a constant width.

An elastic body in the form of a rubber elastic body 38 is interposed between the inner sleeve 18 and the outer sleeve 20 for elastically connecting these sleeves 18, 20. This rubber elastic body 38 is bonded to the outer circumferential surface of the cylindrical portion 22 of the inner sleeve 18 and the inner circumferential surface of the cylindrical portion 26 of the outer sleeve 20 upon vulcanization of a rubber material for forming the rubber elastic body 38. The rubber elastic body 38 is also bonded to the axially inner surface 30 of the flange portion 24 of the inner sleeve 18 and the axially outer surface 35 of the flange portion 28 of the outer sleeve 20 in the above-indicated vulcanization of the rubber material. Thus, the rubber elastic body 38 and the inner and outer sleeves 18, 20 cooperate to form an integrally vulcanized assembly. Described in detail with reference to FIG. 2, the rubber elastic body 38 has an approximately thick-walled cylindrical shape in its entirety, and includes a cylindrical rubber part 40 having a cylindrical shape with an approximately constant thickness dimension W0 and interposed between surfaces opposite in the radial direction of the cylindrical parts 22 and 26, and a tapered cylindrical rubber part 42 having an approximately constant thickness dimension W1 and interposed between. The spacing between the opposite surfaces of the inner and outer sleeves 18, 20 are filled substantially entirety with the cylindrical rubber part 40 and the tapered cylindrical rubber part 42. In the present embodiment, the thickness dimensions of W0 and W1 are determined so as to satisfy the following inequality: W0<W1. Namely, the thickness dimension of the inclined cylindrical rubber part 42 is made larger than the thickness dimension of the cylindrical rubber part 40. The maximum diameter dimension of the bonded surface of the tapered cylindrical rubber part 42 with respect to the axially inner surface 30 of the flange portion 24 of the inner sleeve 18 is made larger than the minimum diameter dimension of the bonded surface of the tapered cylindrical rubber part 42 with respect to axially outer surface 35 of the flange portion 28 of the outer sleeve 20.

After forming the rubber elastic body 38 by the vulcanization of the rubber material, the cylindrical part 26 of the outer sleeve 20 is subjected as needed to a process of all the way drawing or the like, in order to reduce the diameter of the cylindrical part 26. As a result, the elastic body 38 interposed between the inner and outer sleeves 18, 20 is held under an axial compressive force, thus eliminating or minimizing tensile stress applied to the cylindrical rubber part 40.

Further, the cylindrical rubber part 40 is formed with a recess 44 having a semicircular or U-letter shape in cross section and open in one axial end (lower end as seen in FIG. 2) thereof. The recess 44 extends continuously in the circumferential direction of the cylindrical rubber part 40. Also, the tapered cylindrical rubber part 42 is provided in substantially entire area of the spacing between the opposite surfaces of the flange portions 24 and 28 of the inner and outer sleeves 18 and 20. The end part of the flange portion 28 of the outer sleeve 20 is slightly larger in diameter than the end part of the flange portion 24 of the inner sleeve 18. The large-diameter end face of the tapered cylindrical rubber part 42 has an arc-shaped concave void shape extending in the circumferential direction. The large-diameter end face of the tapered cylindrical part 42 may be attached with a filled radius to each of the positions for bonding to the flange portions 24 and 28 of the inner and outer sleeves 18 and 20.

The cylindrical rubber part 40 further includes a pair of voids 46 formed at respective circumferential positions thereof so as to opposed to each other in one diametric direction thereof. Both of these voids 46 open in the end face in the axial direction opposite to the tapered cylindrical rubber part 42, and are formed so as to extend linearly in the axial direction with an approximately constant cross-sectional shape and with a predetermined axial length. The presence of the pair of voids 46 makes it possible to sufficiently gentle the spring characteristics of the elastic body 38 in the diametric direction in which the pair of voids 46 are opposed to each other. The voids 46 have a diameter so that the voids 46 radially extend between the outer circumferential surface of the inner sleeve 18 and the inner circumferential surface of the outer sleeve 20, as large as possible, so that a thin rubber layer is present merely on the surface of the outer and inner surfaces of the inner and outer sleeves 18, 20, for the sake of an operability of a mold upon molding the elastic body 38.

The pair of vibration isolating bushings 12 constructed as described above are inserted into the suspension member 14 and assembled thereto when the end parts of the outer sleeves 20, which have no flange portion 28, are pressed into a fixing bore 48 of the suspension member from both sides in the axial direction of the fixing bore 48. In this respect, the cylindrical part 26 of the outer sleeve 20 serves as a part to be pressed against the suspension member 14 in its entirety. The axially opposite opening parts of the fixing bore 48 of the suspension member 14 are formed as tapered opening surfaces 49 whose angle of incline is approximately identical with the angle of incline β of the flange portion 28 of the outer sleeve 20. For effectively determining the positions for the insertion ends for the fixing bore 48 of the outer sleeves 20, the length in the axial direction of the cylindrical part 26 of the outer sleeve 20 is made less than half of the length in the axial direction of the fixing bore 48, the flange portion 28 of the outer sleeve 20 is held in abutting contact with the tapered opening surface 49 of the suspension member 14, and the annular plate part 36 of the outer sleeve 20 is held in contact with the opening circumferential edge part of the fixing bore 48 of the suspension member 14. In a state where the outer sleeves 20 are positioned relative to the fixing bore 48, the inserted end faces of the outer sleeves 20 of the vibration isolating bushings 12 are mutually spaced apart from each other within the fixing bore 48 by a predetermined axial distance L1. The distance L1 may be obtained by subtracting the length of the cylindrical part 26 in the axial direction of the outer sleeve 20 from the length of the straight part in the axial direction excluding the tapered opening surfaces 49 of the fixing bore 48, and then double the obtained value.

The pair of vibration isolating bushings 12 assembled in this manner into the suspension member 14 are assembled with the body 16 of the vehicle such that one of the flange portions 24, i.e., the upper one as seen in FIG. 1, is held in abutting contact at its axial end face with the body 16 of the vehicle, and is fastened to the body 16 by means of a support bolt 54. More specifically, the support bolt 54 is inserted through a through hole 50 formed through the vehicle body 16 and bores 52 of the inner sleeves 18, and protrudes axially outwardly through a washer 56 superposed on the other flange portion 24, i.e., the lower one as seen in FIG. 1. A fixing nut 58 is thread engaged with the protruding tip part of the support bolt 54, whereby the inner sleeves 18 are firmly fixed together and fixed to the body 16 of the vehicle.

In the attachment state described above, the support bolt 56 inserted through the cylindrical rubber mount assembly 10 is tightened so that the end faces in the axial direction of the inner sleeves 18 of the vibration isolating bushings 12 mutually butt on each other and the inner sleeves 18 of the vibration isolating bushings 12 are connected together integrally or as one piece. As a result, the rubber elastic bodies 38 of the vibration isolating bushings 12 are held in under a compressive force and deformation in a bound and rebound directions of the inner and outer sleeves 18 and 20, i.e., in the upward and downward directions as seen in FIG. 1.

Namely, in the cylindrical rubber mount assembly 10 comprising the pair of vibration isolating bushings 12 assembled into the suspension member 14, rather than each vibration isolating bushing 12 being in a stand-alone non-load state as shown in FIG. 2, the inner sleeve 18 and the outer sleeves 20 are displaced toward each other in the axial direction. As a result, the distance W2 between opposite surfaces, i.e., the axially inner and outer surfaces 30, 35 of the flange portions 24 and 28 of the inner and outer sleeves 18 and 20 is made small, for thereby meeting the following inequality W2<W1. Also, a compression load acts in the axial direction on the tapered cylindrical rubber part 42 provided between the flange portions 24 and 28 based on the relative displacement in the axial direction of the inner and outer sleeves 18 and 20. As a result, the tapered cylindrical rubber part 42 is compressively deformed in the axial direction by an amount L2 (not shown) of relative displacement of the inner and outer sleeves 18 and 20 in the axial direction. The amount L2 of the relative displacement of the inner and outer sleeves 18 and 20 in the axial direction is about a half of the predetermined spacing distance: L1 within the fixing bore 48 of the end surface in the axial direction of the pair of vibration isolating bushings 12.

The cylindrical rubber mount assembly 10 comprising the pair of vibration isolating bushings 12 is thereby adapted to connected the vehicle body 16 to which the inner sleeves 18 are attached and the suspension member 14 to which the outer sleeves 20 are attached, via the elastic bodies 38. With the cylindrical rubber mount 10 installed between the suspension member 14 and the body 16 as described above, the suspension member 14 is thereby connected to the body 16 in a vibration isolating fashion with the help of the effect of the elastic deformation of the rubber elastic bodies 38.

In the cylindrical rubber mount assembly 10 installed in position in the above described manner, a load may be applied not only in the radial direction, but in the axial direction and torsional or bending direction as well. In the present embodiment, particularly, the axially inner surface 30 of the flange portion 24 of the inner sleeve 18 and the axially outer surface 35 of the flange portion 28 of the outer sleeve 20 are formed as the tapered opposite surfaces each extending axially outwardly and radially outwardly, while the tapered cylindrical rubber part 42 is interposed between the inner and outer surfaces 30 and 35. Accordingly, the axial load applied between the inner and outer sleeves 18, 20 acts on the tapered cylindrical rubber part 42 as a compression load component in a compression direction in which the axially inner and outer surfaces 30, 35 are opposed to each other and as a shear load component in a shear direction along the axially inner and outer surfaces 30 and 35 and perpendicular to the compression direction.

As a result, the cylindrical rubber mount assembly 10 according to the present embodiment is capable of exhibiting a desired linear spring characteristics over a wide stroke range upon the axial displacement of the inner and outer sleeves 18, 20 relative to each other, and is also capable of providing a smooth rise or increase of the spring constant thereof upon application of excessively large load thereto. That is, the cylindrical rubber mount assembly 10 makes it possible to exhibit an excellent vibration damping effect and an excellent shock absorbing effect upon application of excessively large load thereto in an effective manner.

Figure 4:
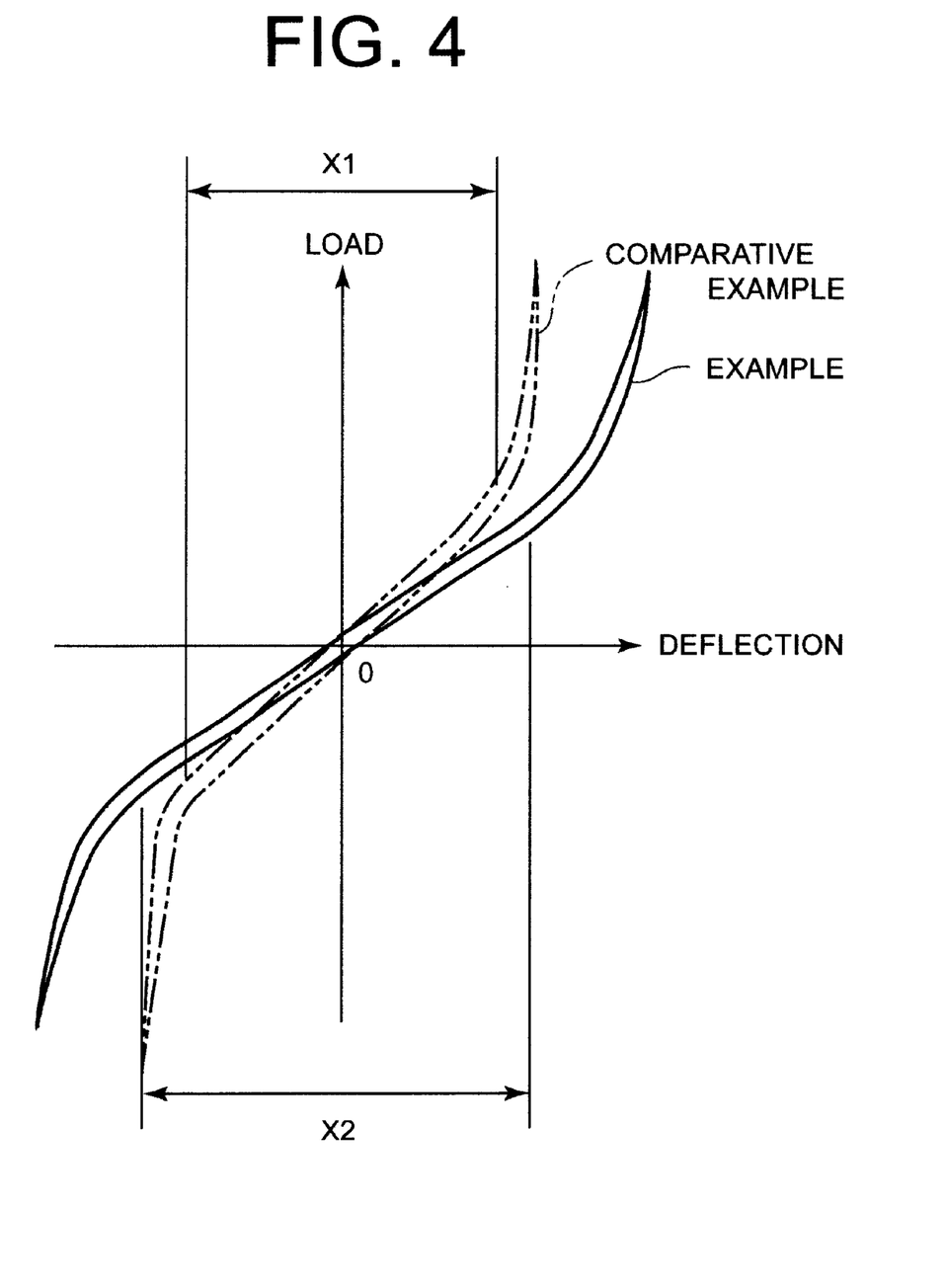
FIG. 4 is a graph showing measured axial-load/deflection characteristics of the cylindrical rubber bushing assembly of FIG. 1 together with the same of a comparative example.

FIG. 4 shows the results of measuring the load-deflection characteristics for the cylindrical rubber mount assembly 10 constructed according to the present embodiment as described above as an Example of the present invention. A similar test was performed on a cylindrical rubber mount assembly with a conventional construction where the flange portion of the inner sleeve and the flange portion of the outer sleeve are annular plate-like members, which extends radially outwardly and are opposed to each other in the axial direction of the inner and outer sleeve members. The results of the measurements of the load-deflection characteristics for the conventional cylindrical rubber mount are indicating alongside in FIG. 4 as a comparative example.

It is clear from the measurement results indicated in FIG. 4 that the stroke range: X1 of the linear spring characteristics are comparatively narrow for the cylindrical rubber mount in the comparative example, while linear spring characteristics were exhibited across a sufficiently wide stroke range: X2 for the cylindrical rubber mount assembly 10 of the Example of the invention. Also, it is clear from the measurement data indicated in FIG. 4 that the rise in the load-deflection characteristics when a relatively large load is applied in the axial direction is smooth and the spring constant increases with a small rate of change for the cylindrical rubber mount assembly 10 of the present embodiment in comparison with the comparative example.

In addition, since the pair of voids 46 are formed in the circumferential portions of the elastic body 38 opposed to each other in the diametric direction of the inner and outer sleeves 18 and 20, the spring ratio in the diametric directions orthogonal to each other are made large, making it possible for the cylindrical rubber mount assembly 10 to exhibit hard spring characteristics in the lateral directions (i.e., the left and the right directions) of the vehicle and soft spring characteristics in the driving directions (i.e., the front and the rear directions) of the vehicle. Thus, the cylindrical rubber mount assembly 10 ensures both of a driving comfort as felt by a driver of the vehicle and a steering stability of the vehicle.

Referring next to FIGS. 5–8, a cylindrical rubber mount assembly 60 is depicted as a second embodiment of the present invention. In the following description as to the second embodiment, the same reference numerals as used in the first embodiment will be used to identify the functionally corresponding elements, and redundant descriptions of those elements will not be provided.

As shown in FIGS. 5 to 8, a cylindrical rubber mount assembly 60 of the present embodiment includes a pair of cylindrical rubber mount in the form of vibration isolating bushings 62. In the vibration isolating bushing 62, the flange portion 28 of the outer sleeve 20 includes four flat plate parts 64 formed at respective circumferential positions thereof so as to extend in a radial direction perpendicular to the central axis 34 with a given circumferential width dimension, so that the flange portion 28 of the outer sleeve 20 is segmented in the circumferential direction. In other words, the flange portion 28 of the outer sleeve 20 includes four flat plate parts 64 and four inclined plate parts 66 disposed at intervals in the circumferential direction of the flat plate parts 64 so as to extend axially outwardly at an angle of incline β approximately identical to that of the axially inner surface 30 of the flange portion 24 of the inner sleeve 18 with respect to the central axis 34 of the inner and outer sleeves 18 and 20. Thus, the four inclined plate parts 66 of the flange portion 28 are located parallel to the axially inner surface 30 of the flange portion 24 with a given spacing therebetween. In the present embodiment, the inclined plate part 66 is longer in the circumferential direction than the flat plate part 64. The flange portion 28 of the outer sleeve 28 further includes an annular plate part 68 integrally formed at its outermost circumferential edge located at approximately the same axial position on the central axis 34 as that of the flat plate part 64, so as to extend continuously over the entire circumference in the circumferential direction. The annular plate part 68 includes the outer circumferential part of the incline plate part 66. A block shaped rubber 70 formed integral with a cylindrical rubber part 40 of the rubber elastic body 38 is interposed between the flange portions 24 of the inner sleeve 18 and the flat plate parts 64 of the flange portion 28 of the outer sleeve 20, which are mutually opposed to each other in the axial direction.

Similar to the aforementioned first embodiment, the tapered cylindrical rubber part 42 is interposed between the inclined plate parts 66 of the outer sleeve 20 and the flange portion 24 of the inner sleeve 18, and is adapted to be subjected to deformation between the inclined plate parts 66 and the flange portion 24 which are opposed to each other in a direction inclined to the central axis 34 of the inner and outer sleeves 18, 20.

Figure 5:
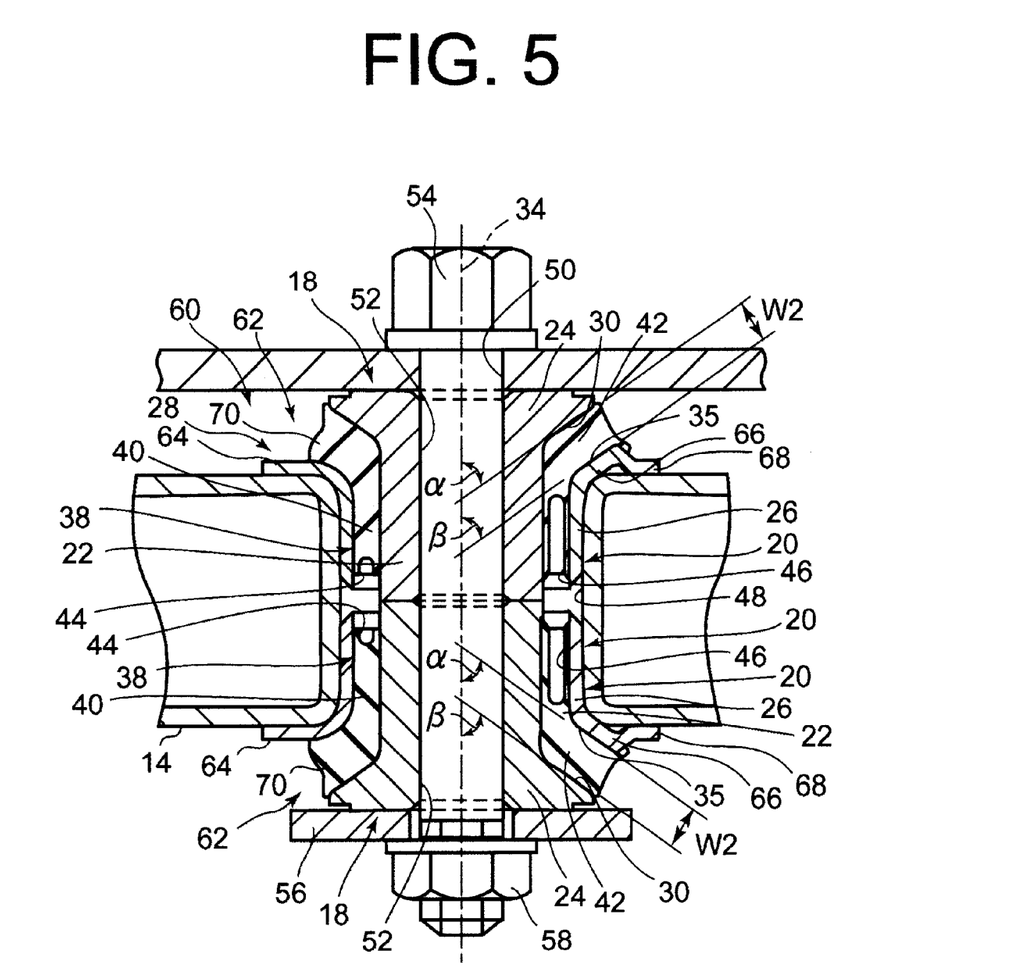
FIG. 5 is an elevational view in vertical or axial cross section of a cylindrical rubber mount assembly constructed according to a second embodiment of the present invention in a state where the assembly is installed the vehicle.
Figure 6:
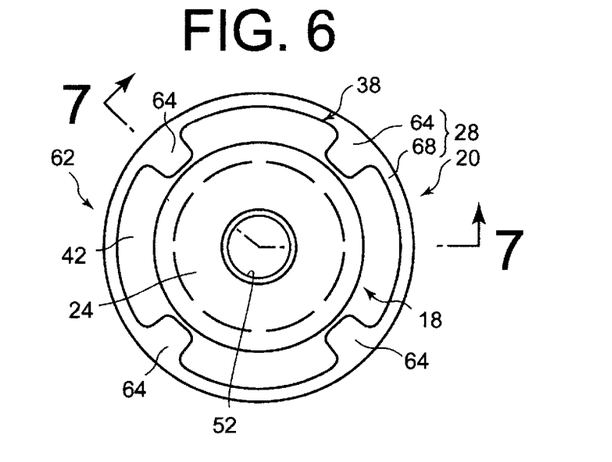
FIG. 6 is a top plane view of one of a pair of vibration isolating bushings of the assembly of FIG. 1.
Figure 7:
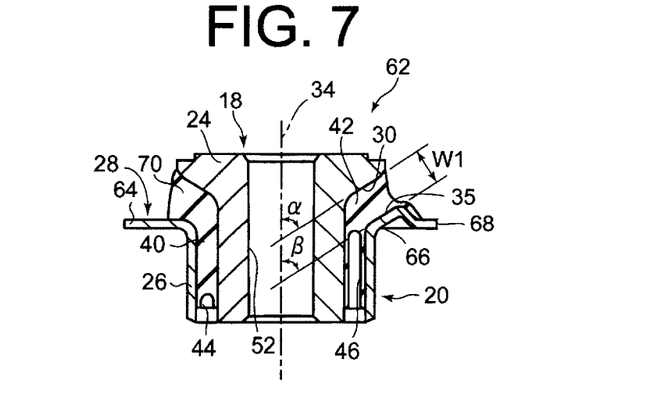
FIG. 7 is a cross sectional view taken along line 7—7 of FIG. 6.
Figure 8:
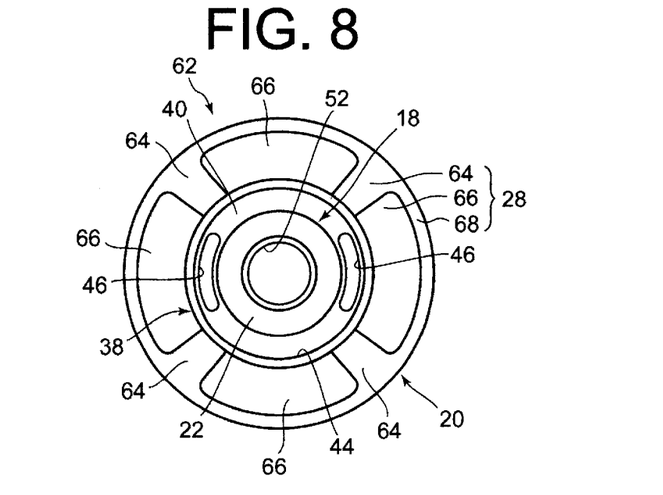
FIG. 8 is a bottom plane view of the vibration isolating bushing of FIG. 6.

As shown in FIG. 5, the pair of vibration isolating bushings 62 thus constructed are superposed on each other in the axial direction and integrally connected together by means of the support bolt 54, like in the aforementioned first embodiment, thereby providing the cylindrical rubber mount assembly 60. The cylindrical rubber mount assembly 60 thus constructed is installed in position between the body 16 and the suspension member 14 of the vehicle in the same manner as the first embodiment.

All of the flat plate parts 64 and the annular plate parts 68 have a flat plate shape extending in the radial direction perpendicular to the central axis 34 of the vibration isolating bushings 62, so that the cylindrical rubber mount assembly 60 of the present embodiment can be superimposed on both end surfaces of the suspension member 14. Unlike the first embodiment, the presence of the flat plate parts 64 and the annular plate parts 68 makes it possible to eliminate a need for providing the tapered opening surface (49) in the fixing bore 48, thus improving an efficiency of manufacturing the cylindrical rubber mount assembly 60, while assuring a strength of the suspension member 14 for supporting the outer sleeve member 20.

Since the inclined plate parts 66 of the flange portion 28 of the outer sleeve 20 and the flange portion 24 of the inner sleeve 18 are made parallel to each other in the direction inclined at a given angle β of incline to the central axis 34, and are opposed to each other with the tapered cylindrical rubber part 42 interposed therebetween, like the first embodiment, the cylindrical rubber mount assembly 60 can exhibit not only linear spring characteristics over a wide range of load applied thereto in the axial direction, but a soft stopper function upon application of a relatively large load thereto with the help of the enlarged stroke length of the rubber elastic body 38 as well. Accordingly, the cylindrical rubber mount assembly 60 of the present embodiment is operable like the cylindrical rubber mount assembly 10 of the first embodiment, and can eventually enjoy the same advantages described above with respect to the first embodiment.

While the present invention has been described in detail with its presently preferred embodiments for the illustrative purpose only, it is to be understood that the invention is not limited to the details of the illustrated embodiments, but may be otherwise embodied.

For instance, in the aforementioned embodiments, the flange portion 24 of the inner sleeve 18 (the axially inner surface 30) and the flange portion 28 of the outer sleeve 20 (the axially outer surface 35) are made approximately parallel along their entirety in the direction inclined to the central axis 34 at the given angle of incline. However, the angle of incline of the inner and outer cylindrical surfaces 30 and 35 to the central axis 34 may be slightly or partially different from each other, while taking into consideration a stress occurring at the rubber elastic body 38 or the ease or efficiency of manufacture of the inner and outer sleeves 18 and 20.

Further, it is possible to provide an intermediate sleeve extending continuously in the circumferential direction of the opposite surfaces of the inner sleeve 18 and the outer sleeve 20 or an intermediate sleeve extending a given length in the circumferential direction, embedded within the rubber elastic body 38. If an intermediate sleeve having a flange portion extending to the interval between the flange portions 24 and 28 of both sleeves 18 and 20 is adopted to be installed between the opposite surfaces of the inner and outer attachments 18 and 20, it is desirable to add a taper approximately parallel to the flange portions 24, 28 of the inner and outer sleeves 18 and 20 to the flange portion of the intermediate sleeve as well, as described in JP-U-2-11244.

While the present invention have been described with respect to the cylindrical elastic mount assembly including two cylindrical elastic mounts assembled together, by way of example, the present invention may be applied to a vibration-isolating connector wherein a single cylindrical elastic mount is used, depending upon required vibration characteristics. In this case, the single cylindrical elastic mount may be installed between two members with the cylindrical elastic mount held under a static load or a pre-compression in the axial direction by utilizing a weight one of the two members, e.g., a body of the vehicle.

The inner sleeve 18 and the outer sleeve 20 may be constructed, for example, such that the flange portion is attached by welding or the like to the end part in the axial direction of a metal sleeve member having approximately fixed inner and outer diameter dimensions.

In the illustrated embodiments, the pair of vibration isolating bushings each being provided with the flange portion and the tapered cylindrical rubber part at one of the end parts in the axial direction are assembled as the cylindrical rubber mount assembly by fitting the pair of vibration isolating bushings into the fixing bore of the suspension member from both opening parts in the axial direction of the fixing bore. However, it is also possible to compose the fixing bore of the suspension member from a plurality of cylindrical part segments, and assemble the vibration isolating bushings with the fixing bore of the suspension member by fitting the cylindrical part segments from both sides in the radial direction to the outer sleeves of the vibration isolating bushings after connecting the pair of vibration isolating bushings in the axial direction integrally or as one piece beforehand. When the cylindrical rubber mount assembly is attached to the suspension member in the this manner, the inner sleeves and outer sleeves may be composed of single members each comprising a flange portion at both ends in the axial direction. Thus, a cylindrical rubber mount assembly according to the aforementioned embodiments can thereby be realized with a single vibration isolating bushing.

While the present invention is applied to a vibration isolating connector used for connecting a suspension member to a body of the vehicle in a vibration isolating fashion, in the aforementioned embodiments, but the present invention can of course be widely applied to various kinds of elastic connecting members or the like intended to be installed between two members connected to each other by means of a shaft.

It is also to be understood that the present invention may be embodied with various other changes, modification sand improvements, which may occur to those skilled in the art, without departing from the spirit and scope of the invention defined in the following claims.

What is claimed is:

1. A cylindrical elastic mount comprising:
   an inner shaft member having an integrally formed flange portion extending radially outwardly from one of axially opposite ends thereof;
   an outer sleeve member disposed around said inner shaft member with a radial spacing therebetween, said outer sleeve member having an integrally formed flange portion extending radially outwardly from one of axially opposite ends thereof corresponding to said one of axially opposite ends of said inner shaft member so that said flange portions of said inner shaft member and said outer sleeve member are opposed to each other in an axial direction parallel to a central axis of said cylindrical elastic mount with a given axial spacing therebetween; and
   an elastic body disposed in said radial spacing between said inner shaft member and said outer sleeve member and in said axial spacing between said flange portions for elastically connecting said inner shaft member and said outer sleeve member,
   wherein said flange portions of said inner shaft member and said outer sleeve member include inclined opposing surfaces that extend substantially parallel to each other, inclined with respect to said central axis, and are elastically connected with each other via said elastic body interposed therebetween, and
   wherein said flange portion of said inner shaft member has a tapered cylindrical share so that said inclined opposing surface thereof extends circumferentially over an entire circumference thereof, while said flange portion of said outer sleeve member has a plurality of inclined plate parts spaced apart circumferentially and a plurality of flat plate parts, each located between an adjacent pair of said inclined plate parts, said inclined plate parts being inclined with respect to said central axis of said cylindrical elastic mount, while said flat plate parts extending radially outwardly with respect to said central axis.

2. A cylindrical elastic mount according to claim 1, wherein an outer diameter of said flange portion of said inner shaft member is larger than an inner diameter of said outer sleeve member.

3. A cylindrical elastic mount according to claim 1 wherein said inclined opposing surfaces of said flange portions of said inner shaft member and said outer sleeve member are inclined at an angle within a range of 40°–70° with respect to said central axis of said cylindrical elastic mount.

4. A cylindrical elastic mount according to claim 1, wherein said flange portion of said outer sleeve member includes an annular plate part formed at an outer circumferential portion thereof, said inclined plate parts extending at an angle toward said central axis from said outer circumferential portion and said flat plate parts extending collinearly with said outer circumferential portion.

5. A cylindrical elastic mount according to claim 1, wherein said elastic body includes a plurality of voids extending in said axial direction between said inner shaft member and said outer sleeve member, and formed at respective circumferential portions thereof so as to adjust spring characteristics thereof.

6. A vibration isolating connector for connecting two members in a vibration isolating fashion, comprising:

a cylindrical elastic mount including a pair of cylindrical elastic mounts each including an inner shaft member having an integrally formed flange portion extending radially outwardly from one of axially opposite ends thereof, an outer sleeve member disposed around said inner shaft member with a radial spacing therebetween, said outer sleeve member having an integrally formed flange portion extending radially outwardly from one of axially opposite ends thereof corresponding to said one of axially opposite ends of said inner shaft member so that said flange portions of said 'inner shaft member and said outer sleeve member are opposed to each other in an axial direction parallel to a central axis of said cylindrical elastic mount with a given axial spacing therebetween, and an elastic body disposed in said radial spacing between said inner shaft member and said outer sleeve member and in said axial spacing between said flange portions for elastically connecting said inner shaft member and said outer sleeve member, wherein said opposite surfaces of said flange portions of said inner shaft member and said outer sleeve member include respective tapered surfaces, which extend approximately parallel to each other in an axially outward direction inclined to said central axis, and are elastically connected with each other via said elastic body interposed therebetween, wherein said flange portions of said inner shaft member and said outer sleeve member include inclined opposing surfaces that extend substantially parallel to each other, inclined with respect to said central axis, and are elastically connected with each other via said elastic body interposed therebetween, wherein said flange portion of said inner shaft member has a tapered cylindrical shape so that said inclined opposing surface thereof extends circumferentially over an entire circumference thereof while said flange portion of said outer sleeve member a plurality of inclined plate parts spaced apart circumferentially and a plural of flat plate parts, each located between an adjacent pair of said inclined elate parts, said inclined plate parts being inclined with respect to said central axis of said cylindrical elastic mount, while said flat plate parts extending radially outwardly with respect to said central axis, and wherein said inner shaft member is adapted to be connected to one of the two members and said outer sleeve member is adapted to be connected to the other of the two members so that said vibration isolating connector is subjected to a static load applied thereto in said axial direction so as to compressively deform said elastic body interposed between said flange portions of said inner shaft member and said outer sleeve member.

7. A cylindrical elastic mount assembly comprising:

a pair of cylindrical elastic mounts each including an inner shaft member having an integrally formed flange portion extending radially outwardly from one of axially opposite ends thereof, an outer sleeve member disposed around said inner shaft member with a radial spacing therebetween, said outer sleeve member having an integrally formed flange portion extending radially outwardly from one of axially opposite ends thereof corresponding to said one of axially opposite ends of said inner shaft member so that said flange portions of said inner shaft member and said outer sleeve member are opposed to each other in an axial direction parallel to a central axis of said cylindrical elastic mount with a given axial spacing therebetween, and an elastic body disposed in said radial spacing between said inner shaft member and said outer sleeve member and in said axial spacing between said flange portions for elastically connecting said inner shaft member and said outer sleeve member, wherein said flange portions of said inner shaft member and said outer sleeve member include inclined opposing surfaces that extend substantially parallel to each other, inclined with respect to said central axis, and are elastically connected with each other via said elastic body interposed therebetween, and wherein said flange portion of said inner shaft member has a tapered cylindrical shape so that said inclined opposing surface thereof extends circumferentially over an entire circumference thereof, while said flange portion of said outer sleeve member has a plurality of inclined plate parts spaced apart circumferentially and a plurality of flat plate parts, each located between an adjacent pair of said inclined plate parts, said inclined plate parts being inclined with respect to said central axis of said cylindrical elastic mount, while said flat plate parts extending radially outwardly with respect to said central axis, wherein said pair of cylindrical elastic mounts are fixedly connected to each other such that said inner shaft members fixedly connected with each other with other ones of said axially opposite ends thereof remote from said flange portions being opposed to each other, and said outer sleeve members are fixedly connected with each other with other ones of said axially opposite ends thereof remote from said flange portions being opposed to each other, and wherein said elastic body of each of said pair of cylindrical elastic mounts is held under an axial compressive force between said flange portions of said inner shaft member and said outer sleeve member.

8. A cylindrical elastic mount assembly according to claim 7, wherein said other ones of axially opposite ends of said inner shaft members of said pair of cylindrical elastic mounts are held in abutting contact with each other, while said other ones of axially opposite ends of said outer sleeve members of said pair of cylindrical elastic mounts are spaced apart from each other.

9. A cylindrical elastic mount assembly according to claim 7, wherein a distance of said spacing between said flange portions of said inner shaft member and said outer sleeve member is made smaller due to an axial static load applied between said inner shaft member and said outer sleeve member, than an initial distance of said spacing measured in said cylindrical elastic mount subjected to no load.

* * * * *